United States Patent
German et al.

(10) Patent No.: US 9,160,117 B2
(45) Date of Patent: *Oct. 13, 2015

(54) TELECOMMUNICATIONS PATCHING SYSTEM THAT FACILITATES DETECTION AND IDENTIFICATION OF PATCH CORDS

(75) Inventors: Michael G. German, Secaucus, NJ (US); Golam M. Choudhury, Warren, NJ (US); Daniel W. Macauley, Fishers, IN (US); Danny L. Satterthwaite, Allen, TX (US); Peter T. Tucker, Dallas, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 928 days.

This patent is subject to a terminal disclaimer.

(21) Appl. No.: 13/361,428

(22) Filed: Jan. 30, 2012

(65) Prior Publication Data

US 2012/0128136 A1     May 24, 2012

Related U.S. Application Data

(63) Continuation of application No. 11/605,806, filed on Nov. 29, 2006, now Pat. No. 8,116,434.

(51) Int. Cl.
    *H04M 1/24*     (2006.01)
    *H01R 13/66*     (2006.01)
    (Continued)

(52) U.S. Cl.
    CPC ........... *H01R 13/6683* (2013.01); *H04Q 1/138* (2013.01); *H01R 24/64* (2013.01)

(58) Field of Classification Search
    CPC ..... H04B 13/6683; H04Q 1/138; H01B 24/64
    USPC ........... 379/32.01, 326, 438; 340/101, 10.42, 340/825.36, 540.135
    See application file for complete search history.

(56) References Cited

U.S. PATENT DOCUMENTS

| | | | |
|---|---|---|---|
| 5,764,043 A | 6/1998 | Czosnowski et al. | ........... 324/66 |
| 6,002,331 A | 12/1999 | Laor | |

(Continued)

FOREIGN PATENT DOCUMENTS

GB     2347507 A     9/2000

OTHER PUBLICATIONS

Chinese Second Office Action Corresponding to Chinese Patent Application No. 200780050467.5; Date of Issue: Nov. 21, 2012; 6 Pages.

(Continued)

*Primary Examiner* — Melur Ramakrishnaiah
(74) *Attorney, Agent, or Firm* — Myers Bigel Sibley & Sajovec

(57) ABSTRACT

A telecommunications patching system includes a patch panel comprising a plurality of connector ports and a plurality of patch cords configured to selectively interconnect pairs of the connector ports. Each patch cord has opposite ends and a respective connector secured to each end that is configured to be removably secured within a connector port. The connectors of a respective patch cord have the same unique identifier associated therewith. A first sensor is located at each connector port and detects when a patch cord connector is inserted within, and removed from, a respective connector port. A second sensor is located at each connector port and reads the identifier of a patch cord connector inserted within a respective connector port. The first and second sensors are in communication with a controller that monitors and logs patch cord interconnections with the connector ports.

20 Claims, 5 Drawing Sheets

(51) Int. Cl.
*H04Q 1/02* (2006.01)
*H01R 24/64* (2011.01)

(56) References Cited

U.S. PATENT DOCUMENTS

| | | | |
|---|---|---|---|
| 6,222,908 B1 * | 4/2001 | Bartolutti et al. | 379/27.01 |
| 6,234,830 B1 | 5/2001 | Ensz et al. | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,424,710 B1 * | 7/2002 | Bartolutti et al. | 379/326 |
| 6,437,894 B1 | 8/2002 | Gilbert et al. | |
| 6,499,861 B1 | 12/2002 | German et al. | |
| 6,522,737 B1 | 2/2003 | Bartolutti et al. | |
| 6,688,910 B1 | 2/2004 | Macauley | 439/491 |
| 6,784,802 B1 | 8/2004 | Stanescu | |
| 7,170,393 B2 | 1/2007 | Martin | |
| 7,193,422 B2 | 3/2007 | Velleca et al. | |
| 7,782,202 B2 | 8/2010 | Downie et al. | 340/572.1 |
| 2004/0044554 A1 | 3/2004 | Bull et al. | |
| 2004/0073597 A1 | 4/2004 | Caveney et al. | |
| 2006/0148279 A1 * | 7/2006 | German et al. | 439/49 |
| 2006/0254355 A1 * | 11/2006 | Zhou | 73/579 |
| 2007/0096984 A1 * | 5/2007 | Leitch et al. | 342/453 |
| 2007/0117444 A1 * | 5/2007 | Caveney et al. | 439/404 |
| 2009/0295413 A1 * | 12/2009 | Borst | 324/713 |

OTHER PUBLICATIONS

International Search Report and Written Opinion of International Searching Authority corresponding to PCT/US2005/044202, mailed May 3, 2006.

International Search Report and Written Opinion of the International Searching Authority corresponding to PCT/US2005/046530, mailed May 30, 2006.

International Search Report and Written Opinion of the International Searching Authority, corresponding to PCT/US2007/024382, mailed May 28, 2008.

* cited by examiner

US 9,160,117 B2

TELECOMMUNICATIONS PATCHING SYSTEM THAT FACILITATES DETECTION AND IDENTIFICATION OF PATCH CORDS

RELATED APPLICATION

This application is a continuation application of U.S. patent application Ser. No. 11/605,806 filed Nov. 29, 2006, which is incorporated herein by reference in its entirety now U.S. Pat. No. 8,116,434.

FIELD OF THE INVENTION

The present invention relates generally to telecommunications systems and, more particularly, to telecommunications patching systems.

BACKGROUND OF THE INVENTION

Many businesses have dedicated telecommunication systems that enable computers, telephones, facsimile machines and the like to communicate with each other through a private network and with remote locations via a telecommunications service provider. In most buildings, the dedicated telecommunications system is hard wired using telecommunication cables that contain conductive wire. In such hard wired systems, dedicated wires are coupled to individual service ports throughout the building. Conventionally, the wires from the dedicated service ports extend through the walls of the building to a telecommunications closet or closets. The telecommunications lines from the interface hub of a main frame computer and the telecommunication lines from external telecommunication service providers may also terminate within a telecommunications closet.

A patching system is typically used to interconnect the various telecommunication lines within a telecommunications closet. In a telecommunications patching system, the telecommunication lines are terminated within a telecommunications closet in an organized manner. The organized terminations of the various lines are provided via the structure of the telecommunications closet. A mounting frame having one or more racks is typically located in a telecommunications closet. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain six telecommunication connector ports 16 (e.g., RJ-45 ports). Other types of patch panels are known, including patch panels with optical fiber ports (e.g., SC, ST, and FC ports) and copper wire ports.

Each telecommunication connector port 16 is hard wired to a respective one of the telecommunications lines. Accordingly, each telecommunications line terminates on a patch panel 12 in an organized manner. In small patch systems, all telecommunications lines may terminate on the patch panels of the same rack. In larger patch systems, multiple racks may be used. Interconnections between the various telecommunications lines are made using patch cords 20. Both ends of each patch cord 20 are terminated with connectors 22, such as, for example, an RJ-45 or RJ-11 telecommunications connector. One end of a patch cord 20 is connected to a connector port 16 of a first telecommunications line and the opposite end of the patch cord 20 is connected to a connector port 16 of a second telecommunications line. By selectively connecting the various lines with patch cords 20, any combination of telecommunications lines can be interconnected.

In many businesses, employees are assigned their own computer network access number exchange so that the employee can interface with a main frame computer or computer network. When an employee changes office locations, it may not be desirable to provide that employee with new exchange numbers. Rather, to preserve consistency in communications, it may be preferred that the exchanges of the telecommunication connection ports in the employee's old office be transferred to the telecommunications ports in the employee's new office. To accomplish this task, patch cords in a telecommunication closet are rearranged so that the employee's old exchanges are now received in his/her new office.

As employees move, change positions, and/or add and subtract lines, the patch cords in a typical telecommunications closet are rearranged quite often. The interconnections of the various patch cords in a telecommunications closet are often logged in either a paper or computer based log. However, technicians may neglect to update the log each and every time a change is made. Inevitably, the log may become less than 100% accurate and a technician may not have a way of reading where each of the patch cords begins and ends. Accordingly, when a technician needs to change a patch cord, it may be necessary for the technician to manually trace that patch cord between two connector ports. To perform a manual trace, the technician locates one end of a patch cord and then manually follows the patch cord until he/she finds the opposite end of that patch cord. Once the two ends of the patch cord are located, the patch cord can be positively identified.

It may take a significant amount of time for a technician to manually trace a particular patch cord, particularly within a collection of other patch cords. Furthermore, manual tracing may not be completely accurate and technicians may accidentally go from one patch cord to another during a manual trace. Such errors may result in misconnected telecommunication lines which must be later identified and corrected. Also, it may be difficult to identify the correct port to which a particular patch cord end should be connected or disconnected. Thus, ensuring that the proper connections are made can be very time-consuming, and the process is prone to errors in both the making of connections and in keeping records of the connections. Accordingly, a need exists for accurately and quickly tracing, detecting and identifying the ends of patch cords in a telecommunications closet. A need also exists for accurately and quickly knowing which patch panel ports are connected by patch cords.

SUMMARY OF THE INVENTION

In view of the above discussion, a telecommunications patching system, according to some embodiments of the present invention, includes a patch panel comprising a plurality of connector ports and a plurality of patch cords configured to selectively interconnect pairs of the connector ports. Each patch cord has opposite ends and a respective connector secured to each end that is configured to be removably secured within a connector port. The connectors of a respective patch cord have the same unique identifier. The telecommunications patching system also includes a plurality of first sensors and a plurality of second sensors. A first sensor is located at each connector port and detects when a patch cord connector is inserted within, and removed from, a respective connector port. A second sensor is located at each connector port and reads the identifier of a patch cord connector inserted within a respective connector port. The first and second sensors are in communication with a controller that monitors and logs patch cord interconnections with the connector ports.

The first sensors may be any type of sensor including, but not limited to, mechanical sensors (e.g., mechanical switches), optical-based sensors, electrical based sensors, etc. For example, each first sensor may include an emitter (e.g., a light emitter, an infrared light emitter, an ultraviolet light emitter, an ultrasonic emitter) that emits electro-magnetic energy and an electromagnetic energy detector that is capable of detected reflections of the electromagnetic energy emitted by a respective emitter. Alternatively, each first sensor may be capable of detecting a magnetic field and each patch cord connector may include a magnetized element.

The second sensors and the identifiers have matched technologies. For example, an identifier can be a UPC bar code or the newer Data Matrix code. In such a case, the second sensor would be a bar code or Data Matrix code reader. Alternatively, the identifier can be data recorded in an optical medium, or a microchip can be placed on the patch cord connector that contains a unique identifier code. If the identifier is recorded in an optical medium, the second sensor would contain a laser reader for reading the optical medium. Similarly, if the identifier were a microchip, the second sensor would be an electronic circuit that interconnects with the microchip when the patch cord connector is inserted into the connector port. Alternatively, each connector of a respective patch cord may include a first transducer that transmits a signal containing the connector identifier. The second sensor may be a second transducer that receives the signal containing the connector identifier. Alternatively, each patch cord connector identifier may be stored within an RFID tag that is physically attached to a patch cord connector. Each second sensor includes an RF antenna that emits RF signals configured to cause a patch cord connector RFID tag to transmit its identifier when excited by emitted RF signals. The RF antenna detects the transmitted identifier of a patch cord connector RFID tag when a patch cord connector is inserted within, and removed from, one of the connector ports. The RF antenna transmits detected patch cord connector identifiers to an RFID reader.

According to other embodiments of the present invention, a single sensor at each connector port may serve the function of the first and second sensors. Accordingly, a single sensor may be configured to detect the insertion and removal of a patch cord connector and to identify the patch cord connector.

According to other embodiments of the present invention, a telecommunications patching system includes a patch panel having a plurality of connector ports, a plurality of patch cords configured to selectively interconnect pairs of the connector ports, and a plurality of sensors configured to detect the presence of a patch cord connector. The sensors may be any type of sensor including, but not limited to, mechanical sensors (e.g., mechanical switches), passive optical-based sensors, and electrical based sensors. As a patch cord connector is inserted within a connector port, the presence of the patch cord is detected by a sensor and read to a controller. Similarly, as a patch cord connector is removed from a connector port, the absence of the patch cord is detected by a sensor and read to the controller. The controller is therefore capable of automatically determining when a patch cord has been added or removed from any connector port. In addition, each patch cord includes a sensing circuit that is completed when both connectors of a patch cord are secured within respective connector ports of a patch panel. When both connectors of a patch cord are inserted within respective connector ports, a circuit is completed and detected by the controller. The sensing circuit may be a conductive wire that extends along the length of each patch cord and has opposite ends configured to engage electrical contact with each connector port. The sensing circuit may include one or more wires added to traditional eight wire and eight contact RJ-45 plugs. The sensing circuit may be an optical fiber that extends along the length of each patch cord and that has opposite ends configured to optically engage with an optical connector at each connector port.

According to other embodiments of the present invention, a telecommunications patching system includes a patch panel having a plurality of connector ports with sensing circuitry associated therewith, a plurality of patch cords configured to selectively interconnect pairs of the connector ports, and a plurality of sensors configured to detect the presence of a patch cord connector. A controller is electrically coupled to each sensor and to the sensing circuitry at each connector port that monitors and logs patch cord interconnections with the connector ports, and that automatically identifies which ports are interconnected by a patch cord when sensing circuitry of two connector ports is completed when the connectors of a patch cord are secured within the two connector ports. The sensing circuitry at each connector port may be configured to send out of band signals through the conductive wire of a patch cord. Alternatively, an additional and dedicated conductive wire may be provided with each patch cord and the sensing circuitry at each connector port may be provided with an additional dedicated contact to engage with the additional dedicated conductor and to apply signal that could be detected on the other end of a patch cord by an additional dedicated contact at the other connector port for the purpose of determining connectivity between the corresponding connector ports. Alternatively, an optical fiber may be provided with each patch cord and the sensing circuitry at each connector port may be configured to send out of band signals through the optical fiber of a patch cord.

Embodiments of the present invention may be utilized with any type of patch panel and corresponding patch cords including, but not limited to, patch panels with RJ-45 and RJ-11 ports, patch panels with optical fiber ports (e.g., SC, ST, and FC ports), and patch panels with copper wire ports.

DETAILED DESCRIPTION OF THE INVENTION

Figure 1:
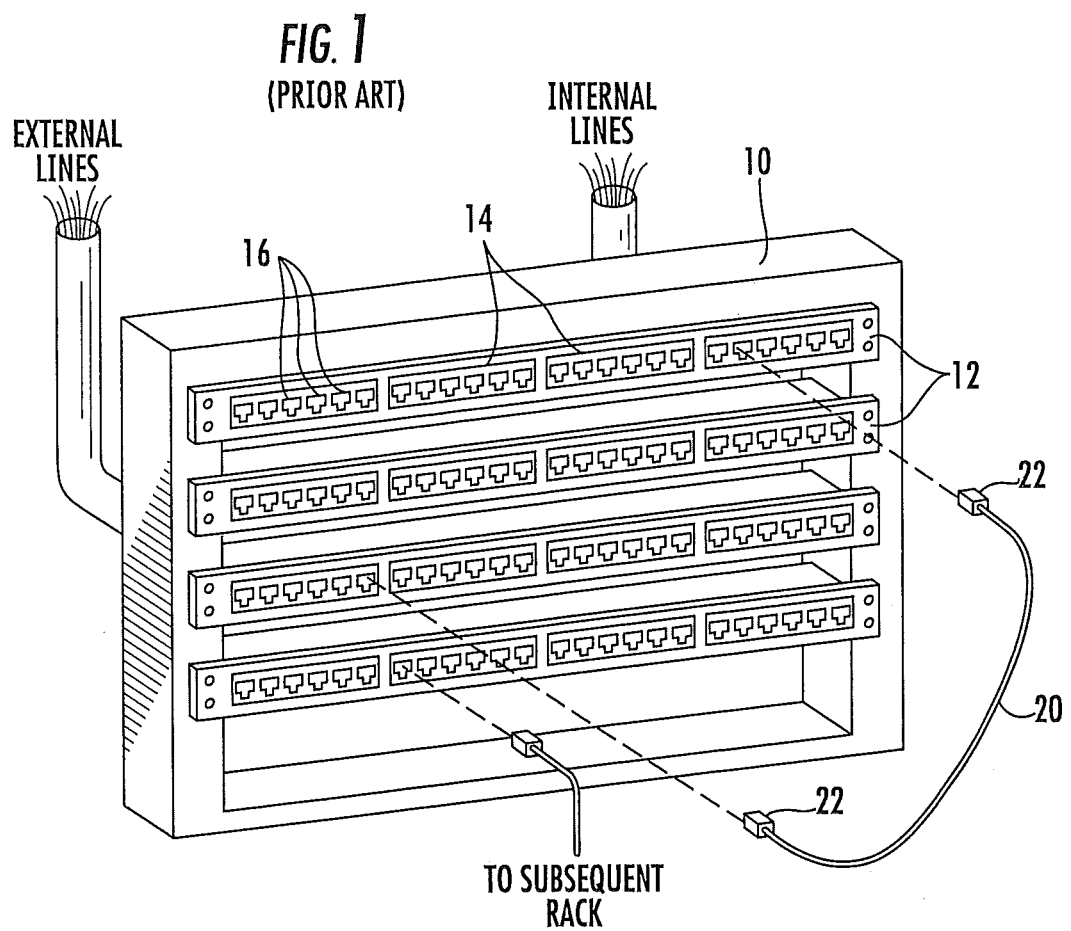
FIG. 1 is a perspective view of a typical prior art telecommunications rack assembly containing multiple patch panels with connector ports that are selectively interconnected by patch cords.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Figure 2:
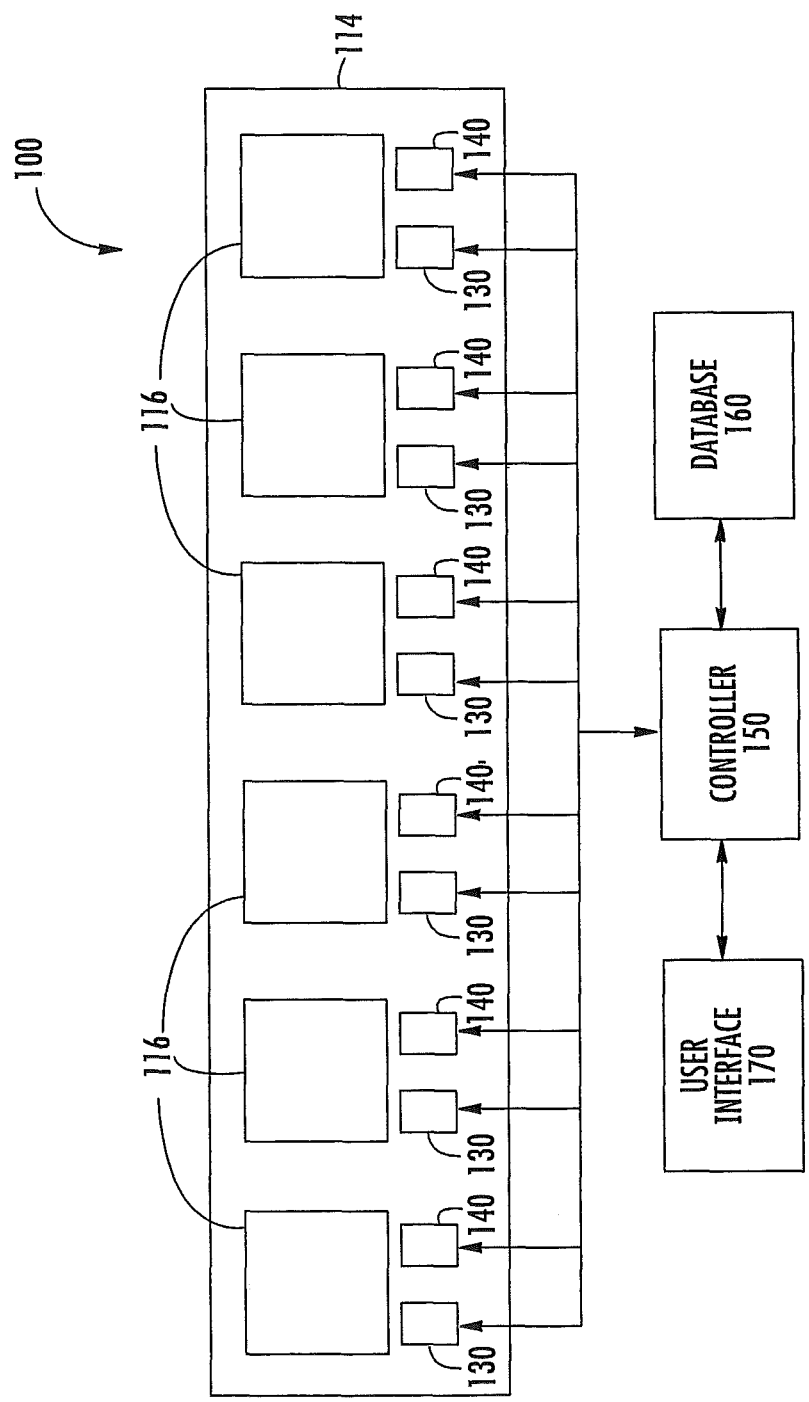
FIG. 2 illustrates a telecommunications patching system, according to some embodiments of the present invention.

Referring now to FIG. 2, a telecommunications patching system 100, according to some embodiments of the present invention, is illustrated. The illustrated telecommunications patching system 100 includes a patch panel 114 comprising a plurality of connector ports 116. A plurality of patch cords 20 (FIG. 1) are configured to selectively interconnect pairs of the connector ports 116. Each patch cord 20 includes opposite ends and a respective connector 22 secured to each end. Each connector 22 is configured to be removably secured within a connector port 116. In addition, the connectors 22 of a respective patch cord 20 have the same unique identifier associated therewith.

A first sensor 130 is located at each connector port 116 and is configured to detect when a patch cord connector 22 is inserted within, and removed from, a respective connector port 116. A second sensor 140 is also located at each connector port 116, and is configured to read the identifier associated with a patch cord connector 22 inserted within a respective connector port 116. A controller 150 is in communication with the first and second sensors 130, 140 of each connector port 116 and is configured to monitor and log patch cord interconnections with the connector ports 116. Controller 150 is connected to a database 160 and to a user interface 170. The user interface 170 allows a system operator to make queries and receive information back as to the connection status of the telecommunications patching system 100 and to identify elements that are to be connected. Any connection status information received by controller 150 may be stored in database 160.

Figure 3:
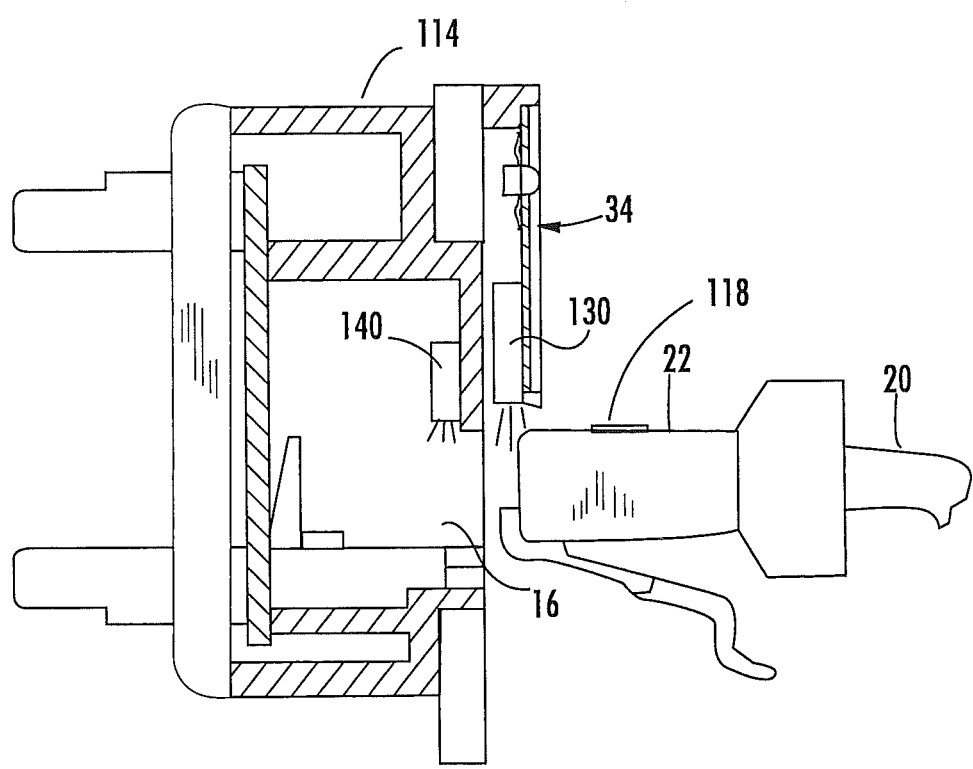
FIG. 3 is a cross-sectional view of a connector port in a patch panel of the telecommunications patching system of FIG. 2, according to some embodiments of the present invention, and that illustrates the location of first and second sensors.

Referring now to FIG. 3, some embodiments of the telecommunications patching system 100 of FIG. 2 are illustrated in further detail. FIG. 3 is a cross-sectional view of a connector port 116 illustrating the location of first and second sensors 130, 140. In the illustrated embodiment, the first sensor 130 is located adjacent to the connector port 116. As a patch cord connector 22 is inserted within connector port 116, the presence of the patch cord 20 is detected by the first sensor 130 and read to the controller 150. Similarly, as a patch cord connector 22 is removed from a connector port 116, the absence of the patch cord 20 is detected by first sensor 130 and read to the controller 150. The controller 150 is therefore capable of automatically determining when a patch cord has been added or removed from any connector port 116.

Figure 4:
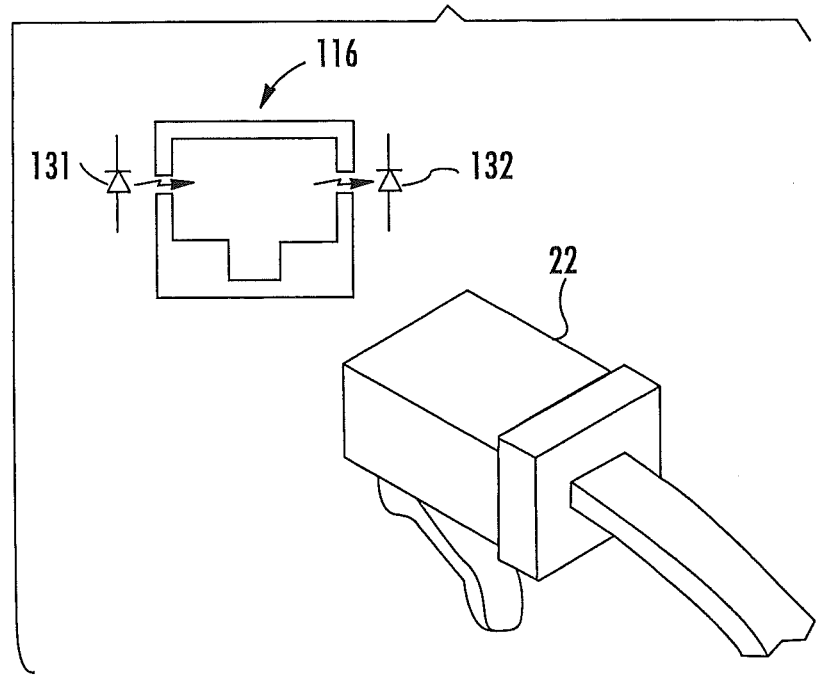
FIG. 4 illustrates a connector port in a patch panel of the telecommunications patching system of FIG. 2, according to some embodiments of the present invention, with a light emitting diode (LED) positioned on one side and a photodiode positioned on the opposite side.

The first sensors 130 may be any type of sensor including, but not limited to, mechanical sensors (e.g., mechanical switches), passive optical-based sensors, and electrical based sensors. Referring to FIG. 4, an exemplary connector port 116 is illustrated with a light emitting diode (LED) 131 positioned on one side of the connector port 116. A photodiode 132 is positioned on the opposite side of the connector port 116. Apertures are formed in the structure of the connector port 116 so that a clear pathway exists in between the LED 131 and the photodiode 132, as illustrated. When no patch cord connector 22 is present within the connector port 116, the photodiode 132 receives the light emitted from the LED 131. However, when a patch cord connector 22 is inserted into the connector port 116, the patch cord connector 22 obstructs the pathway of light. By coupling the photodiode 132 to the controller 150 (FIG. 2), the controller 150 can determine whether or not a particular connector port 116 contains a patch cord connector 22.

Figure 5:
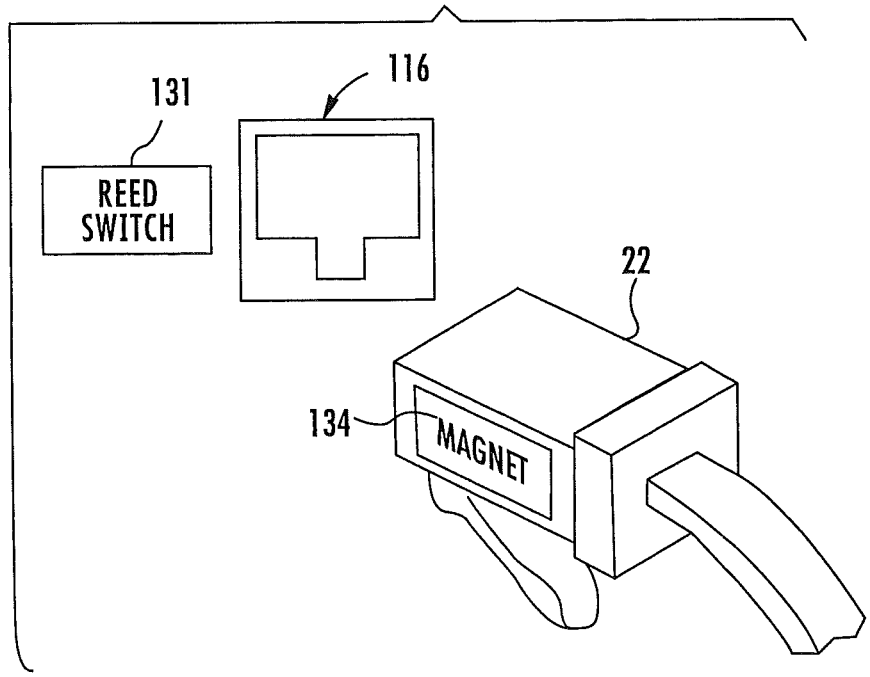
FIG. 5 illustrates a connector port in a patch panel of the telecommunications patching system of FIG. 2, according to some embodiments of the present invention, with a reed switch positioned on one side of the connector port.

Referring to FIG. 5, a connector port 116 is illustrated with a reed switch 133 positioned on one side of the connector port 116. The reed switch 133 is connected to the controller 150 (FIG. 2). When no patch cord connector 22 is present within the connector port 116, the state of the reed switch 133 remains constant, i.e., either open or closed. The illustrated patch cord connector 22 includes a magnetic element 134. When the patch cord connector 22 is inserted into the connector port 116, the magnetic element 134 passes next to the reed switch 133 and changes the state of the reed switch 133. By coupling the reed switch 133 to the controller 150 (FIG. 2), the controller 150 can determine whether or not a particular connector port 116 contains a patch cord connector 22. Other types of sensors that may be utilized for the first sensors 130, according to some embodiments of the present invention, are described in U.S. Pat. Nos. 6,350,148 and 6,222,908.

In the illustrated embodiment of FIG. 3, the second sensor 140 is located within the structure of the patch panel 114 and directly above a respective one of the connector ports 116. As a patch cord connector 22 passes into a connector port 116, the identifier (represented generally as 118 in FIG. 3) associated with the patch cord connector 22 passes below the respective second sensor 140. The second sensor 140 and the identifier 118 have matched technologies. For example, the identifier 118 can be a UPC bar code or the newer Data Matrix code. In such a case, the second sensor 140 would be a bar code or Data Matrix code reader. Alternatively, the identifier 118 can be a magnetic medium, wherein the second sensor 140 would be a magnetic head that reads the magnetic medium. In other embodiments, the identifier 118 can be data recorded in an optical medium, or a microchip can be placed on the patch cord connector 22 that contains a unique identifier code. If the identifier 118 is recorded in an optical medium, the second sensor 140 would contain a laser reader for reading the optical medium. Similarly, if the identifier 118 were a microchip, the second sensor 140 would be an electronic circuit that interconnects with the microchip when the patch cord connector 22 is inserted into the connector port 116.

Alternatively, each connector 22 of a respective patch cord 20 may include a first transducer that transmits a signal containing the connector identifier. The second sensor 140 may comprise a second transducer that receives the signal containing the connector identifier. There are a variety of different types of transducers which may be used in passing the connector identifier from a connector 22 to the second sensor 140. For example, according to some embodiments of the present invention, a connector 22 may include a radio signal transmitter of limited range and the second sensor 140 is configured to receive a radio signal from the transmitter when the connector 22 is within a certain distance of a connector port 116. Other types of transducers that may be utilized in accordance with embodiments of the present invention, include optical transducers which pass light signals back and forth, and any other appropriate signaling technology.

According to some embodiments, each patch cord connector identifier 118 may be stored within an RFID tag that is physically attached to a patch cord connector 22. Each second sensor 140 includes an RF antenna that emits RF signals configured to cause a patch cord connector RFID tag to transmit its identifier when excited by emitted RF signals. The RF antenna detects the transmitted identifier of a patch cord connector RFID tag when a patch cord connector is inserted within, and removed from, one of the connector ports 116. The RF antenna transmits detected patch cord connector identifiers to an RFID reader.

Each second sensor 40, regardless of its type and configuration, is monitored by the controller 150 (FIG. 2). The controller 150 is therefore capable of automatically determining the identity of a specific patch cord connector 22 when that patch cord connector 22 has been added to, or removed from, any connector port 116 due to the unique identifier associated with each patch cord connector 22 and the ability of the corresponding second sensor 140. The controller 150 is therefore capable of monitoring the identity of any and all patch cords 20 that are connected to, or disconnected from, the telecommunications patching system 100 over time. The controller 150 is capable of automatically keeping an accurate log of all changes that have occurred to the patch cords 20. Furthermore, the controller 150 can indicate when a technician has disconnected the ends of two different patch cords 20 rather than the two ends of the same patch cord 20. Each time a patch cord connector 22 is either added to, or removed from, a connector port 116, the patch cord connector 22 can be positively identified.

According to some embodiments of the present invention, a single sensor at each connector port 116 may serve the function of the first and second sensors 130, 140. Accordingly, a single sensor may be configured to detect the insertion and removal of a patch cord connector and to identify the patch cord connector (i.e., read the identifier associated with each patch cord connector).

According to some embodiments of the present invention, a telecommunications patching system includes a patch panel having a plurality of connector ports, a plurality of patch cords configured to selectively interconnect pairs of the connector ports, and a plurality of sensors configured to detect the presence of a patch cord connector, as described above with respect to FIGS. 2-5. As described above, the sensors may be any type of sensor including, but not limited to, mechanical sensors (e.g., mechanical switches), passive optical-based sensors, and electrical based sensors. As a patch cord connector 22 is inserted within a connector port 116, the presence of the patch cord 20 is detected by a sensor 130 (FIG. 2) and read to a controller 150 (FIG. 2). Similarly, as a patch cord connector 22 is removed from a connector port 116, the absence of the patch cord 20 is detected by a sensor 130 and read to the controller 150. The controller 150 is therefore capable of automatically determining when a patch cord has been added or removed from any connector port 116.

Figure 6:
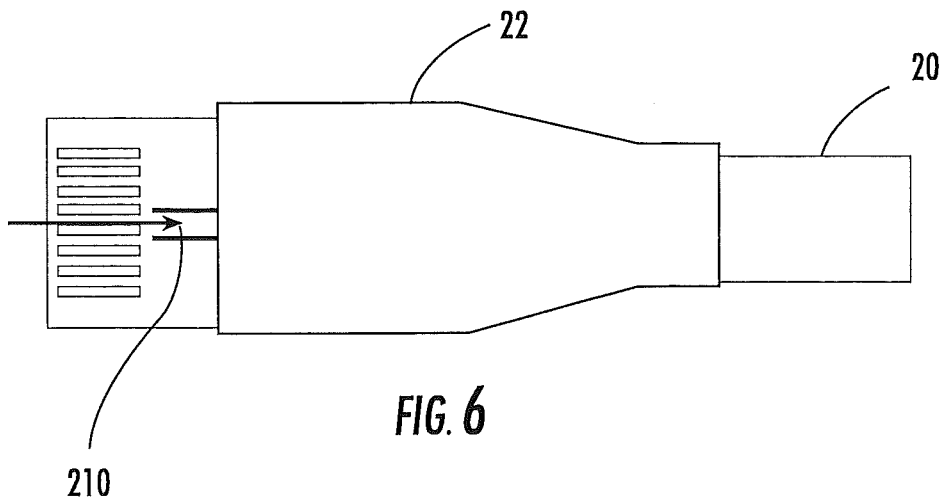
FIGS. 6-7 illustrate a patch cord sensing circuit, according to some embodiments of the present invention.
Figure 7:
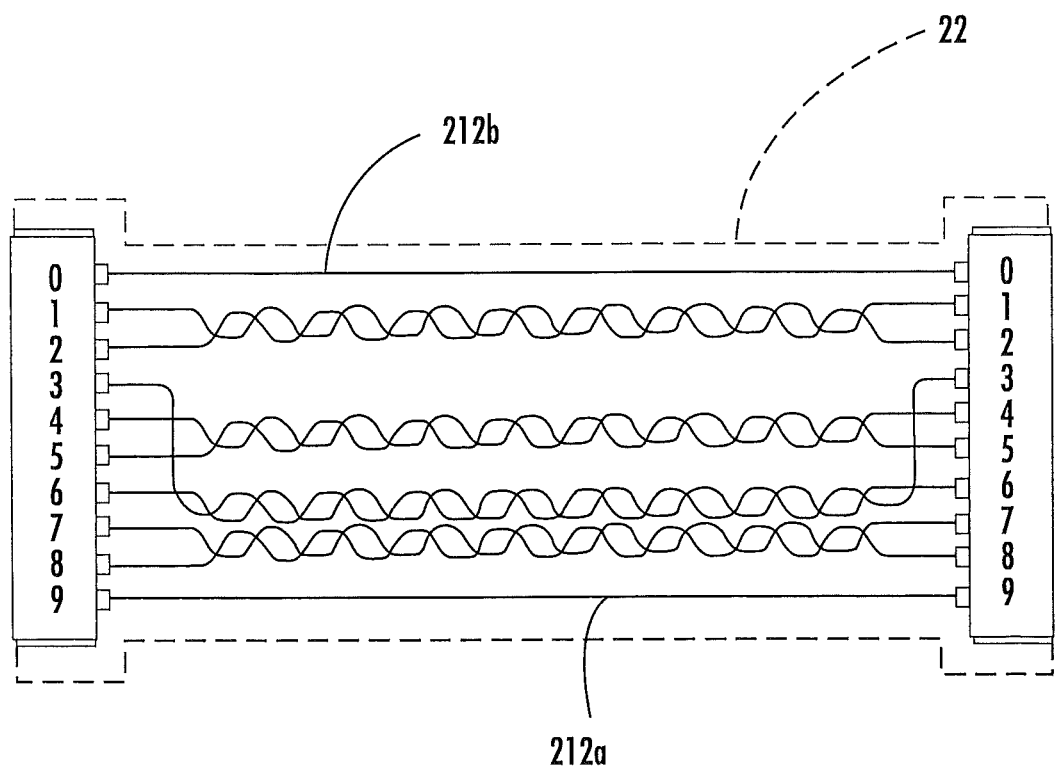

In addition, as illustrated in FIGS. 6-7, each patch cord 20 includes a sensing circuit that is completed when both connectors 22 of a patch cord are secured within respective connector ports 116 of a patch panel. When both connectors 22 of a patch cord 20 are inserted within respective connector ports 116, a circuit is completed and detected by the controller 150. As illustrated in FIG. 6, the sensing circuit may be one or more conductive wires 210 that extend along the length of each patch cord and that have respective opposite ends configured to engage electrical contact with each connector port.

The sensing circuit may be an optical fiber that extends along the length of each patch cord and that has opposite ends configured to optically engage with an optical connector at each connector port. As illustrated in FIG. 7, the sensing circuit includes two wires 212a, 212b added to traditional eight wire and eight contact RJ-45 plugs. The additional contacts are numbered 0 and 9.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching system, comprising:
a patch panel comprising a plurality of connector ports;
a plurality of patch cords configured to selectively interconnect pairs of the connector ports, wherein each patch cord comprises opposite ends and a respective connector secured to each end, wherein each connector is configured to be removably secured within a connector port, and wherein the connectors of a respective patch cord have the same unique identifier associated therewith;
a first sensor located at each connector port that detects when a patch cord connector is inserted within, and removed from, a respective connector port, wherein the first sensor comprises an acoustic sensor;
a second sensor located at each connector port that reads the identifier of a patch cord connector inserted within a respective connector port; and
a controller electrically coupled to the first and second sensors that monitors and logs patch cord interconnections with the connector ports.

2. The telecommunications patching system of claim 1, wherein the identifier associated with each patch cord connector is selected from a group consisting of bar codes, Data Matrix codes, recorded magnetic media, recorded optical media, and electronic circuitry, and wherein the second sensors are selected from a group consisting of bar code readers, Data Matrix code readers, magnetic medium readers, optical medium readers and electronic circuit interfaces.

3. The telecommunications patching system of claim 1, wherein each connector of a respective patch cord comprises a first transducer that transmits a signal containing the connector identifier, and wherein each second sensor comprises a second transducer that receives the signal containing the connector identifier.

4. The telecommunications patching system of claim 1, wherein each patch cord connector comprises an RFID tag, wherein each second sensor comprises an RF antenna that emits RF signals configured to cause a patch cord connector RFID tag to transmit an identifier associated with the patch cord connector when excited by emitted RF signals, wherein the RF antenna detects a transmitted identifier when a patch cord connector is inserted within one of the connector ports, and wherein the RF antenna transmits detected RFID tag identifiers to an RFID reader.

5. The telecommunications patching system of claim 1, wherein each first sensor is located outside of a respective connector port, and wherein each second sensor is located within a respective connector port.

6. The telecommunications patching system of claim 1, wherein acoustic sensor comprises an ultrasonic sensor.

7. A telecommunications patching system, comprising:
a patch panel comprising a plurality of connector ports;
a plurality of patch cords configured to selectively interconnect pairs of the connector ports, wherein each patch cord comprises opposite ends and a respective connector secured to each end, wherein each connector is configured to be removably secured within a connector port, and wherein the connectors of a respective patch cord have the same unique identifier associated therewith;
a first sensor located at each connector port that detects when a patch cord connector is inserted within, and removed from, a respective connector port, wherein the first sensor comprises an electrical sensor;
a second sensor located at each connector port that reads the identifier of a patch cord connector inserted within a respective connector port; and
a controller electrically coupled to the first and second sensors that monitors and logs patch cord interconnections with the connector ports.

8. The telecommunications patching system of claim 7, wherein the identifier associated with each patch cord connector is selected from a group consisting of bar codes, Data Matrix codes, recorded magnetic media, recorded optical media, and electronic circuitry, and wherein the second sensors are selected from a group consisting of bar code readers, Data Matrix code readers, magnetic medium readers, optical medium readers and electronic circuit interfaces.

9. The telecommunications patching system of claim 7, wherein each connector of a respective patch cord comprises a first transducer that transmits a signal containing the connector identifier, and wherein each second sensor comprises a second transducer that receives the signal containing the connector identifier.

10. The telecommunications patching system of claim 7, wherein each patch cord connector comprises an RFID tag, wherein each second sensor comprises an RF antenna that emits RF signals configured to cause a patch cord connector RFID tag to transmit an identifier associated with the patch cord connector when excited by emitted RF signals, wherein the RF antenna detects a transmitted identifier when a patch cord connector is inserted within one of the connector ports, and wherein the RF antenna transmits detected RFID tag identifiers to an RFID reader.

11. The telecommunications patching system of claim 7, wherein each first sensor is located outside of a respective connector port, and wherein each second sensor is located within a respective connector port.

12. A telecommunications patching system, comprising:
a patch panel comprising a plurality of connector ports;
a plurality of patch cords configured to selectively interconnect pairs of the connector ports, wherein each patch cord comprises opposite ends and a respective connector secured to each end, wherein each connector is configured to be removably secured within a connector port, and wherein the connectors of a respective patch cord have the same unique identifier associated therewith;
a first sensor located at each connector port that detects when a patch cord connector is inserted within, and removed from, a respective connector port, wherein the first sensor includes an emitter selected from the group consisting of light emitters, infrared light emitters, and ultraviolet light emitters, and wherein the first sensor includes a detector selected from the group consisting of light detectors, infrared light detectors, and ultraviolet light detectors;

a second sensor located at each connector port that reads the identifier of a patch cord connector inserted within a respective connector port; and a controller electrically coupled to the first and second sensors that monitors and logs patch cord interconnections with the connector ports.

13. The telecommunications patching system of claim 12, wherein the identifier contained in each patch cord connector is selected from a group consisting of bar codes, Data Matrix codes, recorded magnetic media, recorded optical media, and electronic circuitry, and wherein the sensors are selected from a group consisting of bar code readers, Data Matrix code readers, magnetic medium readers, optical medium readers and electronic circuit interfaces.

14. The telecommunications patching system of claim 12, wherein each connector of a respective patch cord comprises a first transducer that transmits a signal containing the connector identifier, and wherein each sensor comprises a second transducer that receives the signal containing the connector identifier.

15. The telecommunications patching system of claim 12, wherein each patch cord connector identifier comprises an RFID tag, wherein each second sensor comprises an RF antenna that emits RF signals configured to cause a patch cord connector RFID tag to transmit its identifier when excited by emitted RF signals, wherein the RF antenna detects the transmitted identifier of a patch cord connector RFID tag when a patch cord connector is inserted within, and removed from, one of the connector ports, and wherein the RF antenna transmits detected RFID tag identifiers to an RFID reader.

16. A telecommunications patching system, comprising:
a patch panel comprising a plurality of connector ports;
a plurality of patch cords configured to selectively interconnect pairs of the connector ports, wherein each patch cord comprises opposite ends and a respective connector secured to each end, wherein each connector is configured to be removably secured within a connector port, wherein each patch cord connector comprises a magnetized element, and wherein the connectors of a respective patch cord have the same unique identifier associated therewith;

a first sensor located at each connector port that detects when a patch cord connector is inserted within, and removed from, a respective connector port, wherein the first sensor is capable of detecting a magnetic field;

a second sensor located at each connector port that reads the identifier of a patch cord connector inserted within a respective connector port; and a controller electrically coupled to the first and second sensors that monitors and logs patch cord interconnections with the connector ports.

17. The telecommunications patching system of claim 16, wherein the identifier contained in each patch cord connector is selected from a group consisting of bar codes, Data Matrix codes, recorded magnetic media, recorded optical media, and electronic circuitry, and wherein the sensors are selected from a group consisting of bar code readers, Data Matrix code readers, magnetic medium readers, optical medium readers and electronic circuit interfaces.

18. The telecommunications patching system of claim 16, wherein each connector of a respective patch cord comprises a first transducer that transmits a signal containing the connector identifier, and wherein each sensor comprises a second transducer that receives the signal containing the connector identifier.

19. The telecommunications patching system of claim 16, wherein each patch cord connector identifier comprises an RFID tag, wherein each second sensor comprises an RF antenna that emits RF signals configured to cause a patch cord connector RFID tag to transmit its identifier when excited by emitted RF signals, wherein the RF antenna detects the transmitted identifier of a patch cord connector RFID tag when a patch cord connector is inserted within, and removed from, one of the connector ports, and wherein the RF antenna transmits detected RFID tag identifiers to an RFID reader.

20. The telecommunications patching system of claim 16, wherein the first sensor comprises a hall effect sensor.

\* \* \* \* \*